(12) United States Patent
Lee

(10) Patent No.: US 6,683,586 B2
(45) Date of Patent: Jan. 27, 2004

(54) APPARATUS AND METHOD OF ADJUSTING HORIZONTAL POSITION FOR A VIDEO DISPLAY APPLIANCE

(75) Inventor: Bong Soon Lee, Kumi (KR)

(73) Assignee: LG Electronics Inc., Seoul (KR)

( * ) Notice: Subject to any disclaimer, the term of this patent is extended or adjusted under 35 U.S.C. 154(b) by 245 days.

(21) Appl. No.: 09/939,827

(22) Filed: Aug. 28, 2001

(65) Prior Publication Data

US 2002/0054034 A1 May 9, 2002

(30) Foreign Application Priority Data

Sep. 1, 2000 (KR) ........................................ 2000-51561

(51) Int. Cl.[7] ................................................ G09G 1/08
(52) U.S. Cl. ........................... 345/13; 345/14; 348/511; 348/747; 315/370
(58) Field of Search ................................ 345/10, 11, 13, 345/14, 698; 348/511, 580, 745, 747; 315/370, 371

(56) References Cited

U.S. PATENT DOCUMENTS

| 4,307,422 A | * | 12/1981 | Das ............................ 348/732 |
| 6,259,483 B1 | * | 7/2001 | Jiang et al. .................. 348/511 |
| 6,266,097 B1 | * | 7/2001 | Jiang et al. .................. 348/511 |

* cited by examiner

*Primary Examiner*—Dennis-Doon Chow
(74) *Attorney, Agent, or Firm*—Jacobson Holman PLLC

(57) ABSTRACT

An apparatus for adjusting a horizontal position of a video display appliance in which a display image is put in the center of a monitor screen. The apparatus includes a comparative circuit, a horizontal correction circuit and a deflection circuit. The comparative circuit detects an overlap signal representing that a horizontal flyback pulse and a video signal are overlapped. The horizontal correction circuit calculates a mean value of first and second horizontal values and transmits the mean value to the deflection circuit. The deflection circuit adjusts the horizontal position using the mean value as an adjustment value to put the display image in the middle of the monitor screen.

13 Claims, 4 Drawing Sheets

APPARATUS AND METHOD OF ADJUSTING HORIZONTAL POSITION FOR A VIDEO DISPLAY APPLIANCE

BACKGROUND OF THE INVENTION

1. Field of the Invention

The present invention relates in general to an apparatus and method of adjusting a horizontal position adjustment apparatus for a video display appliance, and more particularly, to an apparatus and method of adjusting a horizontal position that detects an overlap signal of a horizontal flyback pulse signal and a video signal, and adjusts the horizontal position using the overlap signal.

2. Description of the Prior Art

Video display appliances such as monitors include a horizontal position adjustment circuit in order to place the display image in the center of the screen.

Such conventional apparatuses and methods of adjusting a horizontal position for video display appliance are disclosed in U.S. Pat. No. 6,061,048 to Samsung Electronics Co., Ltd., entitled "Technique For Automatically Controlling The Centering Of monitor Screen", and U.S. Pat. No. 5,801,767 to Amtran Technology Co., Ltd., entitled "Image Screen Automatic Adjustment for Video Monitor".

The above-described patents disclose features in common with the present invention but do not teach or suggest the specifically recited technique for automatically adjusting a horizontal position of the video display appliance as in the present invention.

FIG. 1 is a block diagram showing a conventional horizontal position adjustment circuit.

The conventional horizontal position adjustment circuit includes a front/back porch counter 120, a microprocessor 130 and a deflection circuit 140.

The front/back porch counter 120 receives a horizontal flyback pulse 110 and an RGB video signal 100 and outputs front porch and back porch signals.

The microprocessor 130 includes an I/O port for receiving the front-porch and the back-porch from the counter 120, and a processor for calculating and outputting a horizontal position value to place the display image in the center of the screen.

The deflection circuit 140 adjusts the horizontal position using the horizontal position value inputted from the microprocessor 130 to place the display image in the center of the screen.

FIG. 2 is a flowchart showing the firmware control procedure of the conventional horizontal position adjustment circuit. The conventional horizontal position adjustment circuit will be described in detail with reference to FIG. 2.

First, at step 200, if a new display mode is inputted or a user sets an automatic adjustment of a horizontal position, the front/back porch counter measures the front porch and the back porch using the horizontal flyback pulse and video signal and outputs the front porch and the back porch to the microprocessor at step 210.

Then, at step 220, the microprocessor calculates horizontal position data using the front porch and the back porch to place the position of the image in the center of the screen. At step 230, the calculated horizontal position data is outputted to the deflection circuit.

At step 240, the front/back porch counter measures again a new front porch and a new back porch, and checks whether or not the display image has been placed in the center of the screen.

If it is determined that the display image has not been placed in the center of the screen at step 250, the horizontal position data is calculated again using the front porch and back porch measured at step 260, and the procedure returns to step 230.

Meanwhile, if it is determined that the display image has been placed in the center of the screen at step 250, the procedure is ended.

However, the conventional horizontal position adjustment circuit has the disadvantage that it uses an expensive dedicated IC such as the front/back porch counter, and thus the circuitry becomes complicated with its cost increased.

SUMMARY OF THE INVENTION

It is therefore an object of the present invention to provide a horizontal position adjustment apparatus for a video display appliance that effectively makes adjustments of a horizontal position using simple and inexpensive circuits without the expensive front/back porch counter.

The present invention achieves the above-identified object by providing a horizontal position adjustment apparatus that comprises a comparative circuit, a horizontal position correction circuit and a deflection circuit.

The comparative circuit receives a horizontal flyback pulse and a video signal and outputs a first and second overlap signals.

The first and the second overlap signals are generated when the horizontal flyback signal is inputted with the video signal at the same time. And, the first overlap signal is generated in the left side of the total range of the available horizontal position and the second overlap signal is generating in the right side.

The horizontal position correction circuit receives the first and the second overlap signals from the comparative circuit, calculates a mean value of a first horizontal position value and a second position value and outputs the mean value as an adjustment value of the horizontal position. The first horizontal position value represents the horizontal position when the first overlap signal is generated and the second horizontal position value represents the horizontal position when the second overlap signal is generated.

The deflection circuit adjusts the horizontal position based on the adjustment value.

According to the above described feature of the present invention, the horizontal position may be adjusted using the overlap signal of the horizontal flyback pulse and the video signals to displace the display image into the center of the screen.

Furthermore, the present invention also provides a method of adjusting horizontal position of a video display appliance comprises the steps of detecting a first overlap signal representing that a horizontal flyback pulse is overlapped with a video signal in a left side of a total range of an available horizontal position; detecting a second overlap signal representing that the horizontal flyback pulse is overlapped with the video signal in a right side of the total range of the available horizontal position; calculating a mean value of a first horizontal position value and a second horizontal position value, the first horizontal position value corresponding to the horizontal position when the first overlap signal is generated, and the second horizontal position value corresponding to the horizontal position when the second overlap signal is generated; and adjusting the horizontal position based on the mean value that is used as an adjustment value of the horizontal position.

BRIEF DESCRIPTION OF THE DRAWINGS

Other objects, features and advantages of the present invention will become more apparent by way of the following detailed description of the preferred embodiments. However, it is not intended to limit the invention solely to the embodiments described herein. The description is made with reference to the accompanying drawings, in which.

DETAILED DESCRIPTION OF THE PREFERRED EMBODIMENTS

Figure 1:
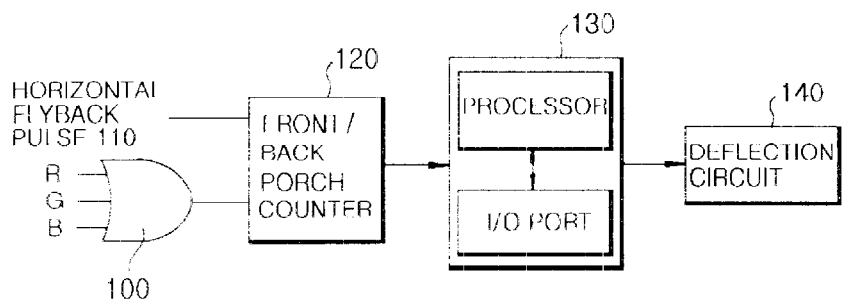
FIG. 1 is a block diagram of a conventional horizontal position adjustment apparatus for a video display appliance.
Figure 2:
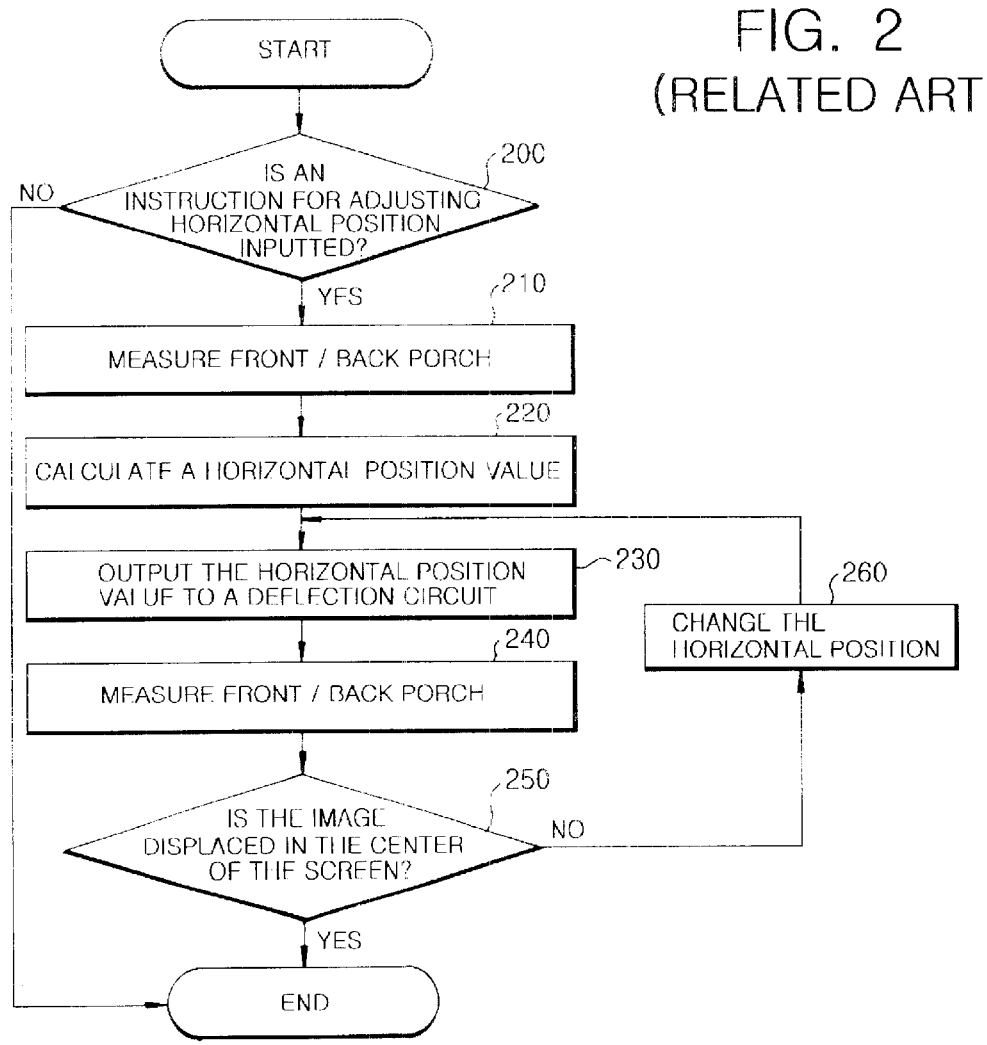
FIG. 2 is a flowchart illustrating a method of adjusting the horizontal position of a video display appliance.
Figure 3:
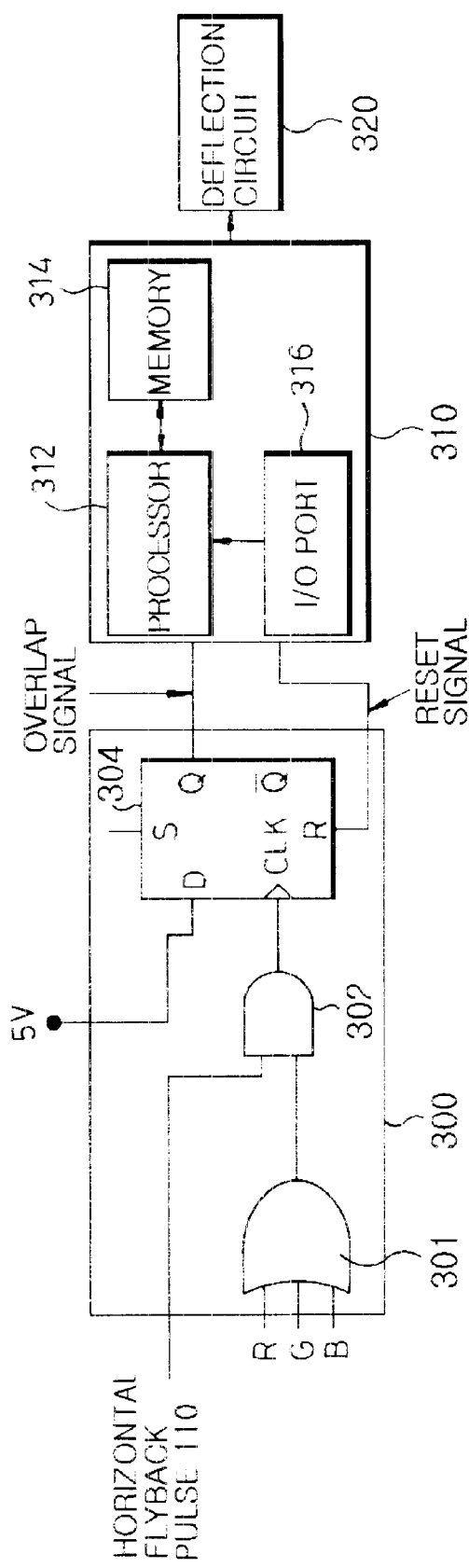
FIG. 3 is a block diagram of a horizontal position adjustment apparatus according to the present invention.

FIG. 3 is a block diagram of a horizontal position adjustment apparatus of the present invention. Referring to FIG. 3, the construction and operation of the apparatus according to the present invention will be described.

The horizontal position adjustment apparatus of the present invention includes a comparative circuit 300, a horizontal position correction circuit 310 and a deflection circuit 320.

The comparative circuit 300 outputs the overlap signal at the moment when a horizontal flyback pulse 110 is overlapped with the output signal of an OR gate 301. The OR gate 301 receives an RGB video signal.

The horizontal position correction circuit 310 couples to the comparative circuit 300. The horizontal position correction circuit 310 inputs a first overlap signal and a second overlap signal, and calculates and outputs an adjustment value of the horizontal position using the first and the second overlap signals.

The comparative circuit 300 includes an OR gate 301, an AND gate 302 and a D-type flip-flop 304.

The OR gate 301 receives the video signal including red, green and blue color signals.

The AND gate 302 receives the output signal of the OR gate 301 and the horizontal flyback pulse 110, and outputs an AND-gated value. Accordingly, if the output signal of the OR gate 301 and the horizontal flyback pulse are at a high level, the output signal of the AND gate 302 is in a high level.

The D-type flip-flop 304 receives the high-level output signal of the AND gate 302 as its CLK input signal, and a high level signal as its D input signal. Therefore, the output signal of the AND gate 302 goes from a low level to a high level to generate the clock pulse, and this high-level output signal is inputted to a Q terminal of the D-type flip-flop. That is, in the comparative circuit, when the output signal of the OR gate 301 and the horizontal flyback signal 110 are in a high level, the overlap signal which represents the moment of overlapping the signals is outputted.

The horizontal position correction circuit 310 includes a memory 314, a processor 312 and an I/O port 316. It is preferred that the horizontal position correction circuit 310 uses a microprocessor in the video display appliance.

The I/O port 316 receives the overlap signal from the D-type flip-flop.

The memory 314 serves as a memory device for storing a horizontal position value representing the horizontal position where the overlap signal is generated.

The processor 312 calculates the mean value of the horizontal position values storing in the memory 314 and sends the mean value through the I/O port 316 to the deflection circuit as an adjustment value of the horizontal position.

The deflection circuit 320 adjusts the horizontal position by using the adjustment value of the horizontal position from the horizontal position correction circuit 310 so that the display image is put in the center of the screen.

The operation of the horizontal position adjustment apparatus in accordance with the present invention will be described in detail with reference to FIGS. 4A through 4C and FIG. 5.

Figure 4A:
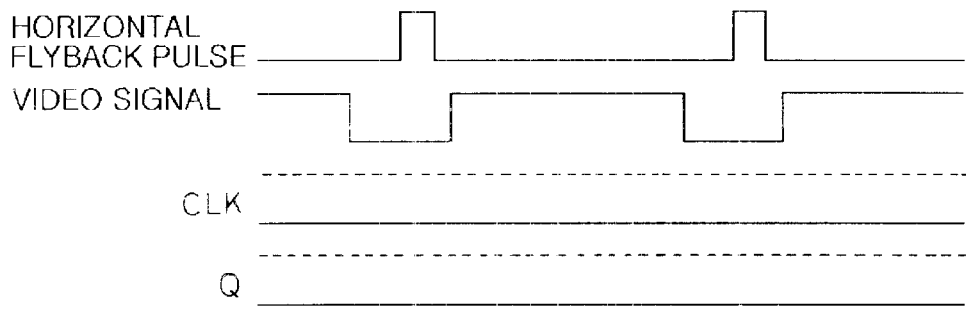
FIGS. 4A to 4C are timing charts of a horizontal flyback pulse, video signal, clock (CLK) pulse and output (Q) signal of a D-type flip-flop.
Figure 4B:
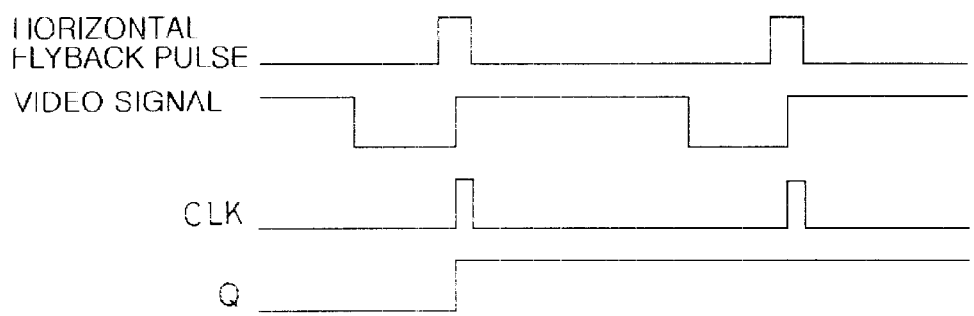
Figure 4C:
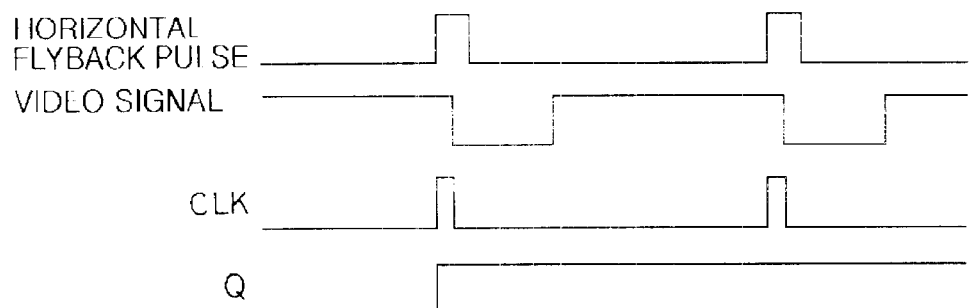

FIGS. 4A through 4C are timing charts representing the horizontal flyback pulse, video signal, clock signal CLK and output signal Q of the D-type flip flop, respectively.

First, FIG. 4A represents the clock pulse CLK and the output signal Q of the D-type flip flop in the comparative circuit before the horizontal flyback pulse and the video signal are overlapped with each other.

FIG. 4B is a timing chart representing the clock pulse CLK and the output signal Q of the D-type flip flop in the comparative circuit when the first overlap signal is detected. The first overlap signal is generated on the left side of the total range of the available horizontal position as the horizontal position value decreases.

FIG. 4C is a timing chart representing the clock pulse CLK and the output signal Q of the D-type flip flop in the comparative circuit when the second overlap signal is detected. The second overlap signal is generated on the right side of the total range of the available horizontal position as the horizontal position value increases.

Figure 5:
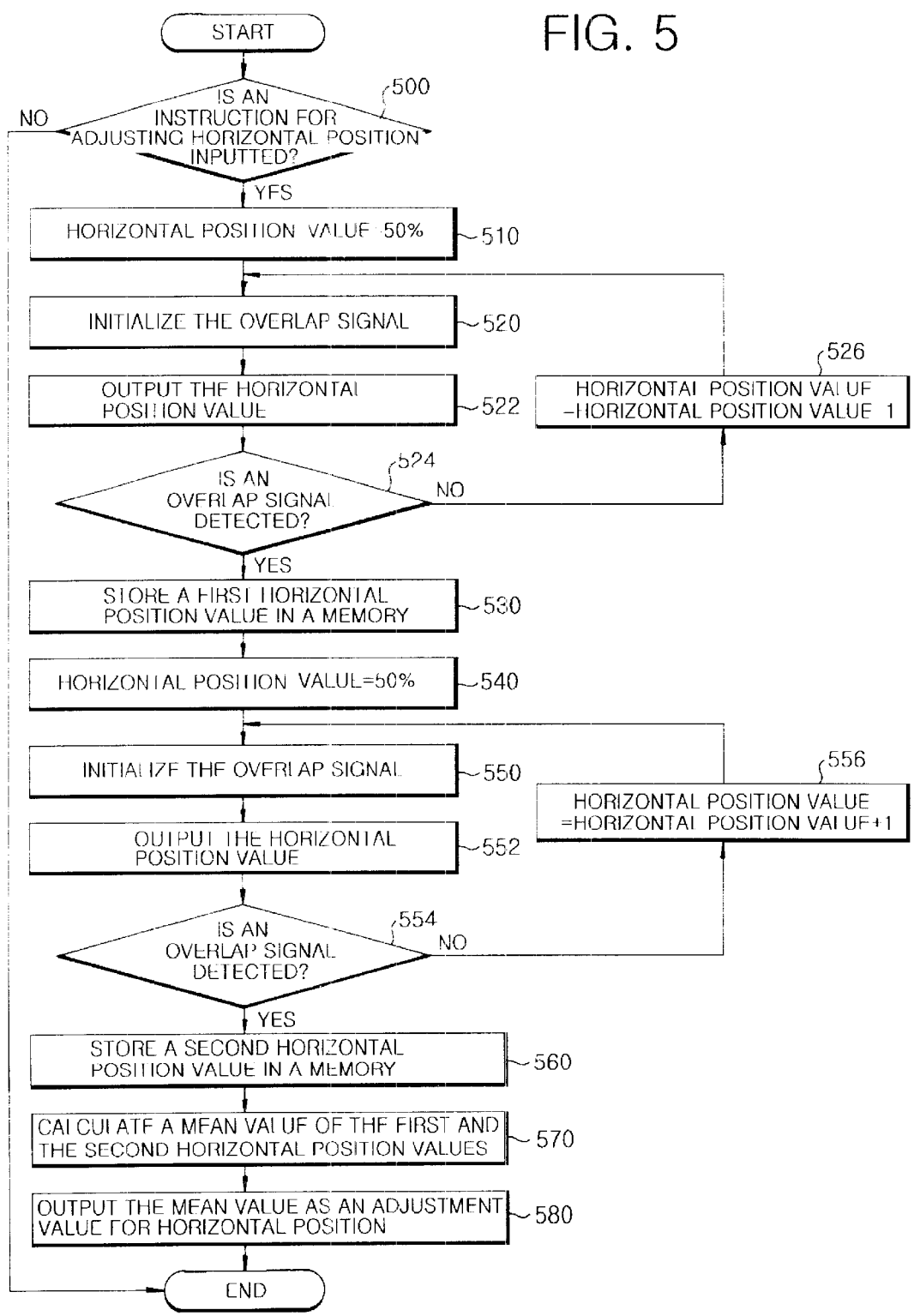
FIG. 5 shows a flowchart representing a method of adjusting the horizontal position in accordance with the present invention.

FIG. 5 shows a flowchart representing the operation of the horizontal position adjustment apparatus in accordance with the present invention.

At Step 500, when a new mode is inputted from the user or there is a need for adjusting the horizontal position, the first and second overlap signals are detected on the left and the right side of the total range of the available horizontal position, respectively To detect the first overlap signal on the left side of the total range of the available horizontal position, the horizontal position value is set by the middle value of the total range of the available horizontal position in step 510.

At step 520, the D-type flip flop is reset to initialize the output signal Q thereof. At step 522, the sets horizontal position value is outputted.

At step 524, under setting the horizontal position, it is checked whether or not the first overlap signal is outputted from the comparative circuit.

When the first overlap signal is detected at step 524, the horizontal position correction circuit stores in the memory the horizontal position value where the first overlap signal is generated at step 530.

However, when the overlap signal is not detected from the comparative circuit at step 524, the value of the horizontal position is subtracted by 1 at step 526, and then the procedure returns to step 520 to repeat the detection of the overlap signal.

To detect the second overlap signal, the horizontal position is set by the middle value of the total range of the available horizontal position at step 540.

Next, at step 550, the D-type flip flop is reset to initialize the output signal Q thereof. At step 552, the set horizontal position value is outputted.

At step 554, it is checked whether or not the second overlap signal is outputted from the comparative circuit under the set horizontal position.

When the second overlap signal is detected at step 554, the horizontal position correction circuit stores in the memory the horizontal position value where the second overlap signal is generated at step 560.

However, when the overlap signal is not detected from the comparative circuit at step 554, the value of the horizontal position is increased by 1 at step 556, and then the procedure returns to step 550 to repeat the detection of the second overlap signal.

The mean value of the first horizontal position value and the second horizontal position value is then calculated at step 570. The mean value is inputted to the deflection circuit as an adjustment of the horizontal position at step 580. The deflection circuit adjusts the horizontal position using the adjustment value to put the display image in the center of the screen.

As described above, according to the apparatus and method for adjusting the horizontal position of a video display appliance, the horizontal position may be arbitrarily adjusted. Therefore, the display image can be put in the center of the monitor screen.

It should be understood that the present invention is not limited to the particular embodiment disclosed herein as the best mode contemplated for carrying out the present invention. It is intended to cover various modifications and similar arrangements included within the spirit and scope of the appended claims. Also, it is intended that the scope of the present invention be defined by the following claims and their equivalents.

What is claimed is:

1. An apparatus for adjusting a horizontal position of a video display appliance, the apparatus comprising:

a comparative circuit for receiving a horizontal flyback pulse and a video signal and outputting an overlap signal, the overlap signal being generated when the horizontal flyback signal is inputted simultaneously with the video signal;

a horizontal position correction circuit for calculating an adjustment value of the horizontal position based on the overlap signal and outputting the adjustment value; and a deflection circuit for adjusting the horizontal position on the basis of the adjustment value.

2. The apparatus according to claim 1, wherein the comparative circuit comprises:

an OR gate for OR-gating the video signal of red, green and blue;

an AND gate for AND-gating the horizontal flyback signal and an output signal of the OR gate; and a D-type flip-flop for receiving an output signal of the AND gate as its CLK signal, and a high-level signal as its D-input signal.

3. The apparatus according to claim 1, wherein the horizontal position correction circuit comprises:

a memory for storing the horizontal position value representing the horizontal position where the overlap signal is generated, the overlap signal being inputted from the comparative circuit;

a processor for obtaining an adjustment value of the horizontal position based on the horizontal position value, the horizontal position value being stored in the memory; and an I/O port for receiving the overlap signal from the comparative circuit and outputting the adjustment value of the horizontal position to the deflection circuit.

4. The apparatus according to claim 3, wherein the horizontal position correction circuit comprises a microprocessor of the video display appliance.

5. An apparatus for adjusting a horizontal position of a video display appliance, the apparatus comprising:

a comparative circuit for receiving a horizontal flyback pulse and a video signal and outputting a first overlap signal and a second overlap signal, the first and second overlap signals being generated when the horizontal flyback pulse is inputted simultaneously with the video signal, the first overlap signal being generated on a left side of a total range of the available horizontal position, and the second overlap signal being generated on a right side of a total range of the available horizontal position;

a horizontal position correction circuit for calculating a mean value of first and second horizontal position values and for outputting the mean value as an adjustment value of the horizontal position, the first horizontal position value representing the horizontal position when the first overlap signal is generated, and the second horizontal position value representing the horizontal position when the second overlap signal is generated; and a deflection circuit for adjusting the horizontal position based on the adjustment value.

6. The apparatus according to claim 5, wherein the comparative circuit comprises:

an OR gate for OR-gating the video signal of red, green and blue;

an AND gate for AND-gating the horizontal flyback signal and an output signal of the OR gate;

a D-type flip-flop for receiving an output signal of the AND gate as its CLK signal and outputting a high-level signal when the output signal of the AND gate is in a high level.

7. The apparatus according to claim 5, wherein the horizontal position correction circuit comprises:

a memory for storing the first horizontal position value and the second horizontal position value;

a processor for calculating a mean value of the first horizontal position value and the second horizontal position value, the mean value being used as an adjustment value of the horizontal position;

an I/O port for receiving the overlap signal from the comparative circuit and outputting the mean value to the deflection circuit.

8. The apparatus according to claim 7, wherein the horizontal position correction circuit comprises a microprocessor of the video display appliance.

9. A method of adjusting a horizontal position of a video display appliance, the method comprising the steps of:

detecting a first overlap signal representing that an horizontal flyback pulse is overlapped with a video signal on a left side of a total range of an available horizontal position;

detecting a second overlap signal representing that the horizontal flyback pulse is overlapped with the video signal in a right side of the total range of the available horizontal position;

calculating a mean value of first and second horizontal position values, the first horizontal position value corresponding to the horizontal position where the first overlap signal is generated, and the second horizontal position value corresponding to the horizontal position where the second overlap signal is generated; and adjusting the horizontal position based on the mean value which is used as an adjustment value of the horizontal position.

10. The method according to claim 9, further comprising the step of storing the first horizontal position value and the second horizontal position value in a memory.

11. The method according to claim 9, wherein the step of adjusting the horizontal position comprises the steps of:

outputting the mean value to the deflection circuit; and adjusting the horizontal position based on the mean value as the adjustment value.

12. The method according to claim 9, wherein the step of detecting the first overlap signal comprises the steps of:

obtaining an OR-gated value of the video signal of red, green and blue;

obtaining an AND-gated value of the OR-gated value of the video signal and the horizontal flyback pulse as the horizontal position moves from a center to a left side of a total range in an available horizontal position;

outputting the first overlap signal when the AND-gated value is in a high level; and storing the first horizontal position value representing the horizontal position where the first overlap signal is generated.

13. The method according to claim 9, wherein the step of detecting second overlap signal comprises the steps of:

obtaining an OR-gated value of the video signal of red, green and blue;

obtaining an AND-gated value of the OR-gated value of the video signal and the horizontal flyback pulse as the horizontal position moves from a center to a right side of a total range in an available horizontal position;

outputting the second overlap signal when the AND-gated value is in a high level; and storing the second horizontal position value representing the horizontal position where the second overlap signal is generated.

* * * * *